United States Patent
Yeom et al.

(10) Patent No.: US 12,291,244 B2
(45) Date of Patent: May 6, 2025

(54) SYSTEM AND METHOD FOR CONTROLLING SWITCHING TO MANUAL DRIVING MODE OF AUTONOMOUS VEHICLE

(71) Applicants: Hyundai Motor Company, Seoul (KR); Kia Corporation, Seoul (KR)

(72) Inventors: Myung Ki Yeom, Incheon (KR); In Su Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 232 days.

(21) Appl. No.: 18/174,112

(22) Filed: Feb. 24, 2023

(65) Prior Publication Data
US 2024/0149922 A1 May 9, 2024

(30) Foreign Application Priority Data
Nov. 3, 2022 (KR) .......................... 10-2022-0144850

(51) Int. Cl.
*B60W 60/00* (2020.01)
*B60W 10/08* (2006.01)
(Continued)

(52) U.S. Cl.
CPC ........ *B60W 60/0053* (2020.02); *B60W 10/08* (2013.01); *B60W 10/184* (2013.01);
(Continued)

(58) Field of Classification Search
CPC ............. B60W 60/0053; B60W 10/08; B60W 10/184; B60W 10/20; B60W 30/18127;
(Continued)

(56) References Cited

U.S. PATENT DOCUMENTS

| | | | |
|---|---|---|---|
| 10,053,074 B2 | 8/2018 | Kindberg | |
| 10,093,292 B2 | 10/2018 | Moore et al. | |

(Continued)

FOREIGN PATENT DOCUMENTS

| | | | | |
|---|---|---|---|---|
| DE | 102019206981 A1 | * | 11/2020 | .......... B60W 50/087 |
| KR | 20200063314 A | | 6/2020 | |
| KR | 20220019878 A | | 2/2022 | |

*Primary Examiner* — Michael D Lang
(74) *Attorney, Agent, or Firm* — SLATER MATSIL, LLP (57) ABSTRACT

An embodiment system for controlling switching to a manual driving mode of an autonomous vehicle includes a steering controller configured to determine whether a steering angle is changed according to operation of a steering wheel by a driver, a braking controller configured to apply braking torque to a braking device of each wheel, a motor controller configured to apply individual regenerative braking torque and driving torque to each wheel, and an autonomous driving controller configured to determine a control torque for maintaining straight-ahead driving and to issue an instruction using a feedforward control scheme when a steering angle change signal according to the operation of the steering wheel by the driver is received from the steering controller in a transition section in which an autonomous driving mode is switched to the manual driving mode during high-speed straight-ahead driving of the autonomous vehicle.

18 Claims, 6 Drawing Sheets

(51) Int. Cl.
*B60W 10/184* (2012.01)
*B60W 10/20* (2006.01)
*B60W 30/18* (2012.01)
*B60W 50/00* (2006.01)
*B60W 50/10* (2012.01)

(52) U.S. Cl.
CPC ...... *B60W 10/20* (2013.01); *B60W 30/18127* (2013.01); *B60W 50/0098* (2013.01); *B60W 50/10* (2013.01); *B60W 2050/0012* (2013.01); *B60W 2050/0026* (2013.01); *B60W 2520/10* (2013.01); *B60W 2520/14* (2013.01); *B60W 2540/18* (2013.01); *B60W 2710/083* (2013.01); *B60W 2710/18* (2013.01); *B60W 2710/20* (2013.01)

(58) Field of Classification Search
CPC ............. B60W 50/0098; B60W 50/10; B60W 2050/0012; B60W 2050/0026; B60W 2520/10; B60W 2520/14; B60W 2540/18; B60W 2710/083; B60W 2710/18; B60W 2710/20

See application file for complete search history.

(56) References Cited

U.S. PATENT DOCUMENTS

| | | |
|---|---|---|
| 2022/0041175 A1 | 2/2022 | Kim |
| 2022/0355858 A1* | 11/2022 | Pandy ..................... B62D 6/10 |

* cited by examiner

SYSTEM AND METHOD FOR CONTROLLING SWITCHING TO MANUAL DRIVING MODE OF AUTONOMOUS VEHICLE

CROSS-REFERENCE TO RELATED APPLICATIONS

This application claims the benefit of Korean Patent Application No. 10-2022-0144850, filed on Nov. 3, 2022, which application is hereby incorporated herein by reference.

TECHNICAL FIELD

The present disclosure relates to a system and method for controlling switching to a manual driving mode of an autonomous vehicle.

BACKGROUND

An autonomous vehicle includes a manual driving mode in which a driver may directly intervene in driving in addition to an autonomous driving mode for driving to a destination by itself without the driver directly operating a steering wheel, an accelerator pedal, a brake pedal, etc.

In general, when a driving mode of the autonomous vehicle is switched from the autonomous driving mode to the manual driving mode, there is a transition section of a predetermined time in order to ensure stability of driving mode switching control.

When the autonomous vehicle is switched to the manual driving mode during high-speed driving in the autonomous driving mode, if there is manual driving intervention such as an unintentional operation of a steering wheel by a driver, the vehicle may rapidly become unstable.

For example, in a transition section during transition from the autonomous driving mode to the manual driving mode while the autonomous vehicle is driven straight ahead at high speed, when the driver unintentionally operates the steering wheel to generate even a slight steering angle, a driving state of the vehicle may become unstable as yaw rate behavior of the vehicle is greatly changed.

Accordingly, when unstable yaw rate behavior of the vehicle occurs due to the unintentional steering wheel operation of the driver in the transition section, an autonomous driving controller of the autonomous vehicle performs a control operation to stop change to the manual driving mode and continuously maintain the autonomous driving mode. As a result, there may be a disadvantage in that, even though the driver desires to change to the manual driving mode, the driver cannot change to the manual driving mode since vehicle driving and posture stability are prioritized.

In addition, as a conventional method for solving instability of yaw rate behavior of the vehicle due to unintentional steering wheel operation by the driver other than stopping change to the manual driving mode and maintaining the autonomous driving mode, the autonomous driving controller performs feedback control for posture control of the vehicle.

For example, an existing feedback control method for posture control of the vehicle may include a process of calculating a target yaw rate, which is target behavior of the vehicle, based on a change in the steering angle caused by unintentional steering wheel operation of the driver, a process of detecting an actual yaw rate occurring in the vehicle, and a process of performing braking control for stable posture control of the vehicle when a difference between the target yaw rate and the actual yaw rate is greater than or equal to a certain value.

At this time, when the steering angle is changed, a yaw rate change of the vehicle finally occurs through a tire angle change, generation of a tire wheel slip angle, generation of tire lateral force, etc. Therefore, a delay of a certain time occurs from the change in the steering angle to the yaw rate behavior of the vehicle. As a result, braking control for stable posture control of the vehicle may be performed after the delay occurs.

Therefore, in the existing feedback control method for controlling the posture of the vehicle, braking control, etc. for stable posture control of the vehicle may be performed only when the yaw rate behavior of the vehicle becomes unstable after a delay of a certain period of time elapses from a time when the steering angle is generated due to unintentional steering wheel operation by the driver. Accordingly, there is a disadvantage in that driving stability of the vehicle deteriorates during the delay of the certain period of time.

The above information disclosed in this background section is only for enhancement of understanding of the background of embodiments of the invention and therefore it may contain information that does not form the prior art that is already known to a person of ordinary skill in the art.

SUMMARY

The present disclosure relates to a system and method for controlling switching to a manual driving mode of an autonomous vehicle. Particular embodiments relate to a system and method for controlling switching to a manual driving mode of an autonomous vehicle enabling the autonomous vehicle to stably switch to a manual driving mode while the autonomous vehicle is driven straight ahead at high speed in an autonomous driving mode.

Embodiments of the present invention can solve problems associated with the prior art. An embodiment of the present invention provides a system and method for controlling switching to a manual driving mode of an autonomous vehicle, which allows driving torque and braking torque of the vehicle to be controlled using a feedforward torque control method so that straight-ahead driving of the vehicle is continuously maintained without being affected by a steering direction according to an operation of a driver before an unstable yaw rate of the vehicle occurs due to a steering angle caused by unintentional steering wheel operation by the driver in a transition section in which a driving mode is switched from an autonomous driving mode to a manual driving mode while the autonomous vehicle is driven straight ahead at high speed, so that unstable yaw rate change of the vehicle may be prevented, and change to the manual driving mode may be stably performed by inducing straight-ahead driving as a result of canceling out vehicle rotation in a steering direction by an operation of the driver and vehicle rotation in an opposite direction by feedforward torque control.

One embodiment of the present invention provides a system for controlling switching to a manual driving mode of an autonomous vehicle, the system including a steering controller configured to determine whether a steering angle is changed according to operation of a steering wheel by a driver, a braking controller configured to apply braking torque to a braking device of each wheel, a motor controller configured to apply individual regenerative braking torque and driving torque to each wheel, and an autonomous driving controller configured to determine control torque for maintaining straight-ahead driving and issue an instruction using a feedforward control scheme when a steering angle change signal according to an operation of the steering wheel of the driver is received from the steering controller in a transition section in which an autonomous driving mode is switched to a manual driving mode during high-speed straight-ahead driving of the autonomous vehicle.

In a preferred embodiment, the system may further include a steering angle sensor configured to transmit a signal for detecting a change in the steering angle of the steering wheel to the steering controller and a torque sensor configured to detect steering torque when the driver holds the steering wheel and to transmit the steering torque to the steering controller.

In another preferred embodiment, the autonomous driving controller may be configured to determine control torque for maintaining the straight-ahead driving from a control torque map including control torque predetermined for each steering angle and vehicle speed or to calculate the control torque for maintaining the straight-ahead driving using an equation [Control torque=K× abs(abs(current steering angle)−critical steering angle)×(current vehicle speed−critical vehicle speed)], where K denotes a fixed constant, and abs denotes an absolute value.

In still another preferred embodiment, the autonomous driving controller may be configured to determine feedforward torque control for maintaining the straight-ahead driving to be first-stage torque control, to execute the first-stage torque control when control torque for maintaining the straight-ahead driving is less than or equal to a first reference control torque, to determine the feedforward torque control for maintaining the straight-ahead driving to be second-stage torque control including the first-stage torque control, and to execute the second-stage torque control when the control torque for maintaining the straight-ahead driving exceeds the first reference control torque and is less than or equal to a second reference control torque.

In yet another preferred embodiment, the first-stage torque control executed by the autonomous driving controller may be performed by additionally applying driving torque in addition to driving torque for current driving to one of respective wheels of the vehicle on one side in a steering direction and applying regenerative braking torque to another one of the respective wheels on an opposite side in the steering direction at the same time.

In still yet another preferred embodiment, the second-stage torque control executed by the autonomous driving controller may be performed by additionally applying driving torque in addition to driving torque for current driving to one of respective wheels of the vehicle on one side in a steering direction, applying regenerative braking torque to another one on an opposite side in the steering direction at the same time and applying braking torque to a wheel to which regenerative braking torque is applied.

In a further preferred embodiment, when torque control for maintaining the straight-ahead driving exceeds the second reference control torque, the autonomous driving controller may be configured to perform a control operation to maintain the autonomous driving mode without switching to the manual driving mode.

In another further preferred embodiment, the autonomous driving controller may be configured to further execute feedback control for adjusting a posture of the vehicle to a stable posture to address occurrence of a yaw rate change and a lateral acceleration change of the vehicle after the first-stage torque control or the second-stage torque control is executed.

In still another further preferred embodiment, upon determining that the posture of the vehicle is stabilized after executing feedback control for adjusting the posture of the vehicle to the stable posture, the autonomous driving controller may be configured to perform a control operation to switch a driving mode of the autonomous vehicle to the manual driving mode desired by the driver.

Another embodiment of the present invention provides a method of controlling switching to a manual driving mode of an autonomous vehicle, the method including verifying whether there is a request for switching to a manual driving mode while the autonomous vehicle is driven in an autonomous driving mode, determining whether the autonomous vehicle is driven straight ahead at high speed when there is the request for switching to the manual driving mode, determining whether a steering angle of a steering wheel changes by an operation of a driver in a transition section in which the autonomous driving mode is switched to the manual driving mode during high-speed straight-ahead driving, determining control torque for maintaining straight-ahead driving upon determining that there is a change in the steering angle according to a steering wheel operation of the driver, and executing feedforward torque control for maintaining straight-ahead driving according to the magnitude of the determined control torque.

In a preferred embodiment, the determining of whether the steering angle of the steering wheel changes may include verifying whether the driver holds the steering wheel based on a steering torque detection signal of a torque sensor and determining a change in the steering angle of the steering wheel based on a steering angle detection signal of a steering angle sensor.

In another preferred embodiment, when control torque for maintaining the straight-ahead driving is determined to be less than or equal to a first reference control torque, first-stage torque control may be executed as feedforward torque control for maintaining the straight-ahead driving, and when the control torque for maintaining the straight-ahead driving is determined to exceed the first reference control torque and to be less than or equal to a second reference control torque, second-stage torque control including the first-stage torque control may be executed as the feedforward torque control for maintaining the straight-ahead driving.

In still another preferred embodiment, the first-stage torque control may be performed by additionally applying driving torque in addition to driving torque for current driving to one of respective wheels of the vehicle on one side in a steering direction and applying regenerative braking torque to another one on an opposite side in the steering direction at the same time.

In yet another preferred embodiment, the second-stage torque control may be performed by additionally applying driving torque in addition to driving torque for current driving to one of respective wheels of the vehicle on one side in a steering direction, applying regenerative braking torque to another one on an opposite side in the steering direction at the same time, and applying braking torque to a wheel to which regenerative braking torque is applied.

In still yet another preferred embodiment, when torque control for maintaining the straight-ahead driving is determined to exceed the second reference control torque, a control operation may be performed to maintain the autonomous driving mode without switching to the manual driving mode.

In a further preferred embodiment, feedback control for adjusting a posture of the vehicle to a stable posture may be further executed to address occurrence of a yaw rate change and a lateral acceleration change of the vehicle after the first-stage torque control or the second-stage torque control is executed.

In another further preferred embodiment, upon determining that the posture of the vehicle is stabilized after executing feedback control for adjusting the posture of the vehicle to the stable posture, a control operation may be performed to switch a driving mode of the autonomous vehicle to the manual driving mode desired by the driver.

Other aspects and preferred embodiments of the invention are discussed infra.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawings.

DETAILED DESCRIPTION OF ILLUSTRATIVE EMBODIMENTS

Hereinafter, preferred embodiments of the present invention will be described in detail with reference to the accompanying drawings.

Figure 1:
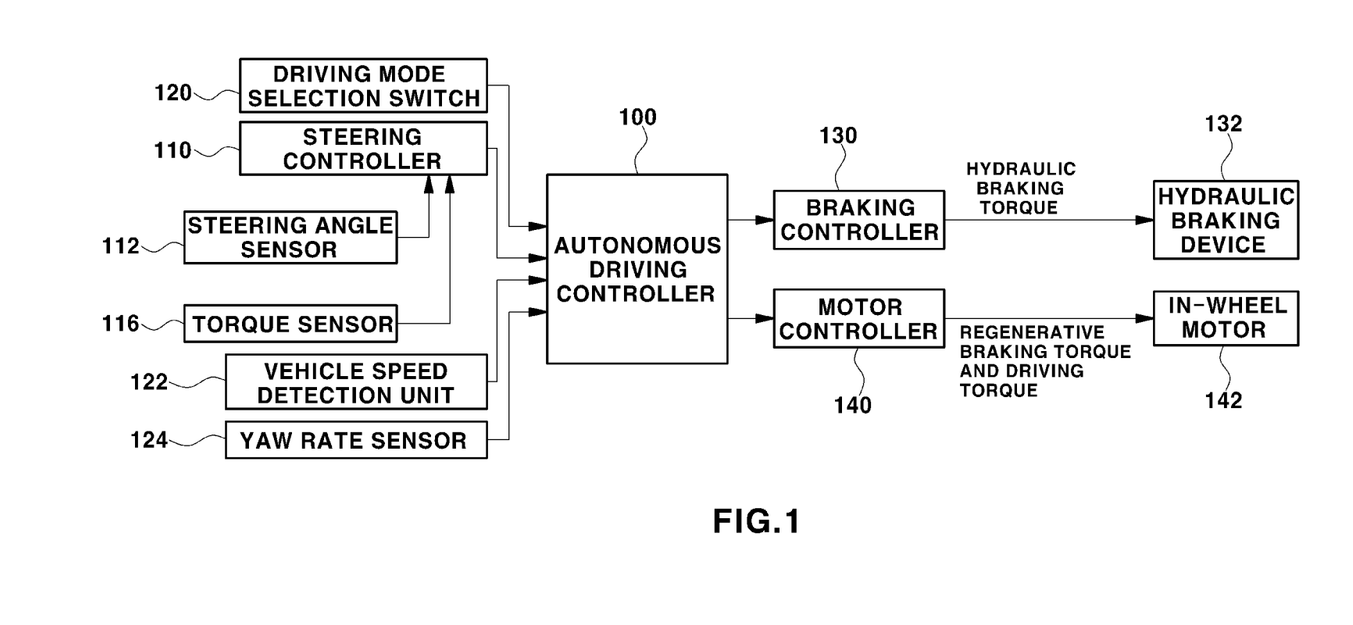
FIG. 1 is a control configuration diagram illustrating a system for controlling switching to a manual driving mode of an autonomous vehicle according to embodiments of the present invention.

FIG. 1 is a control configuration diagram illustrating a system for controlling switching to a manual driving mode of an autonomous vehicle according to embodiments of the present invention.

As illustrated in FIG. 1, the autonomous vehicle is equipped with an autonomous driving controller 100 for overall driving control of the autonomous vehicle, a steering controller 110 for reporting whether a steering angle is generated is connected to an input side of the autonomous driving controller 100 so as to transmit a signal, and a braking controller 130 and a motor controller 140 are connected to an output side of the autonomous driving controller 100 so as to receive a command signal.

As is well known, the autonomous driving controller 100 is configured to receive monitoring information required for autonomous driving from an autonomous detector including a camera mounted on the vehicle, GPS, navigation, radio detection and ranging (RADAR) or light imaging detection and ranging (LiDAR), etc., and perform overall driving control including a driving direction, acceleration, and deceleration of the vehicle based on this monitoring information.

In addition, the autonomous driving controller 100 is configured to perform a control operation to switch a driving mode to an autonomous driving mode or a manual driving mode according to a switching signal of a driving mode selection switch 120.

The steering controller 110 is configured to perform steering control according to steering intent based on turning driving logic of the autonomous driving controller or steering intent based on an operation of the steering wheel of the driver and is configured to determine whether the steering angle is changed according to an operation of the steering wheel of the driver in a transition section from the autonomous driving mode to the manual driving mode during high-speed straight-ahead driving of the autonomous vehicle.

For example, the steering controller 110 is configured to determine whether the steering angle is generated by an unintentional operation of the steering wheel of the driver in the transition section in which the driving mode is switched from the autonomous driving mode to the manual driving mode while the autonomous vehicle is driven straight ahead at high speed and to transmit a determination result to the autonomous driving controller 100.

At this time, a torque sensor 116 for detecting steering torque of the steering wheel is connected to the steering controller 110 so as to transmit a signal. Thus, the torque sensor 116 may detect steering torque while the driver is holding the steering wheel and transmit the steering torque to the steering controller 110, and the steering controller 110 may transmit, to the autonomous driving controller 100, a signal indicating that there is unintentional steering wheel operation by the driver based on a detection signal of the torque sensor 116.

In addition, a steering angle sensor 112 is connected to the steering controller 110 so as to transmit a signal. Thus, the steering angle sensor 112 detects a steering angle generated according to the unintentional steering wheel operation of the driver and transmits the steering angle to the steering controller 110, and the steering controller 110 may transmit a change value of the steering angle of the steering wheel detected by the steering angle sensor 112 to the autonomous driving controller 100.

Accordingly, when the driver holds the steering wheel in an autonomous driving state in which the steering wheel does not need to be held, the steering torque may increase slightly. Therefore, the autonomous driving controller 100 may check a state in which the driver holds the steering wheel, that is, a state in which the driver unintentionally operates the steering wheel, based on a steering torque detection signal of the torque sensor 116 transmitted from the steering controller 110, and confirm that the steering angle has changed according to the unintentional steering wheel operation of the driver based on the change value of the steering angle of the steering wheel transmitted from the steering controller 110.

The braking controller 130 is configured to control hydraulic braking torque for a hydraulic braking device 132 mounted on each wheel according to a hydraulic braking torque command from the autonomous driving controller 100.

Preferably, the braking controller 130 may be an integrated electric brake (IEB) controller including electronic stability control (ESC) for body posture control.

The motor controller 140 is an in-wheel motor controller mounted on each wheel and is configured to control individual regenerative braking torque and/or driving torque for each in-wheel motor (IWM) 142 mounted in each wheel according to a driving torque command or a regenerative braking torque command of the autonomous driving controller 100.

In particular, upon receiving a steering angle change signal according to the steering wheel operation of the driver from the steering controller 110 in the transition section in which the autonomous driving mode is switched to the manual driving mode during high-speed straight-ahead driving of the autonomous vehicle, the autonomous driving controller 100 may be configured to determine control torque for maintaining the straight-ahead driving before yaw rate behavior occurs due to steering of the driver and to instruct the motor controller 140 or the motor controller 140 and the braking controller 130 to apply the determined control torque using a feedforward control scheme.

The control torque for maintaining the straight-ahead driving is torque for maintaining straight-ahead driving of the vehicle when a steering angle is generated according to unintentional steering wheel operation by the driver in the transition section in which the autonomous driving mode is switched to the manual driving mode and may be a sum of driving torque additionally applied to one in-wheel motor on one side (for example, an in-wheel motor mounted on a rear wheel in a steering direction) among in-wheel motors mounted on respective wheels of the vehicle and regenerative braking torque applied to another one on the opposite side (for example, an in-wheel motor mounted on a rear wheel in a direction opposite to the steering direction).

Alternatively, the control torque for maintaining the straight-ahead driving is torque for maintaining straight-ahead driving of the vehicle when a steering angle is generated according to unintentional steering wheel operation by the driver in the transition section in which the autonomous driving mode is switched to the manual driving mode and may be a sum of driving torque additionally applied to one in-wheel motor on one side (for example, the in-wheel motor mounted on the rear wheel in the steering direction) among in-wheel motors mounted on respective wheels of the vehicle, regenerative braking torque applied to another one on the opposite side (for example, the in-wheel motor mounted on the rear wheel in the direction opposite to the steering direction), and hydraulic braking torque applied to a wheel equipped with an in-wheel motor to which regenerative braking torque is applied.

Accordingly, the autonomous driving controller 100 may be configured to instruct the motor controller 140 to apply, as control torque for maintaining straight-ahead driving, driving torque to be applied to one in-wheel motor on one side (for example, the in-wheel motor mounted on the rear wheel in the steering direction) among in-wheel motors mounted on respective wheels and regenerative braking torque to be applied to another one on the opposite side (for example, the in-wheel motor mounted on the rear wheel in the direction opposite to the steering direction) at the same time.

Alternatively, the autonomous driving controller 100 may be configured to instruct the motor controller 140 to apply, as control torque for maintaining straight-ahead driving, driving torque to be applied to one in-wheel motor on one side (for example, an in-wheel motor mounted on a rear wheel in a steering direction) among in-wheel motors mounted on respective wheels and regenerative braking torque to be applied to another one on the opposite side (for example, the in-wheel motor mounted on the rear wheel in the direction opposite to the steering direction) at the same time, and to instruct the braking controller 130 to apply hydraulic braking torque to a wheel on a side to which the regenerative braking torque is applied.

Figure 5:
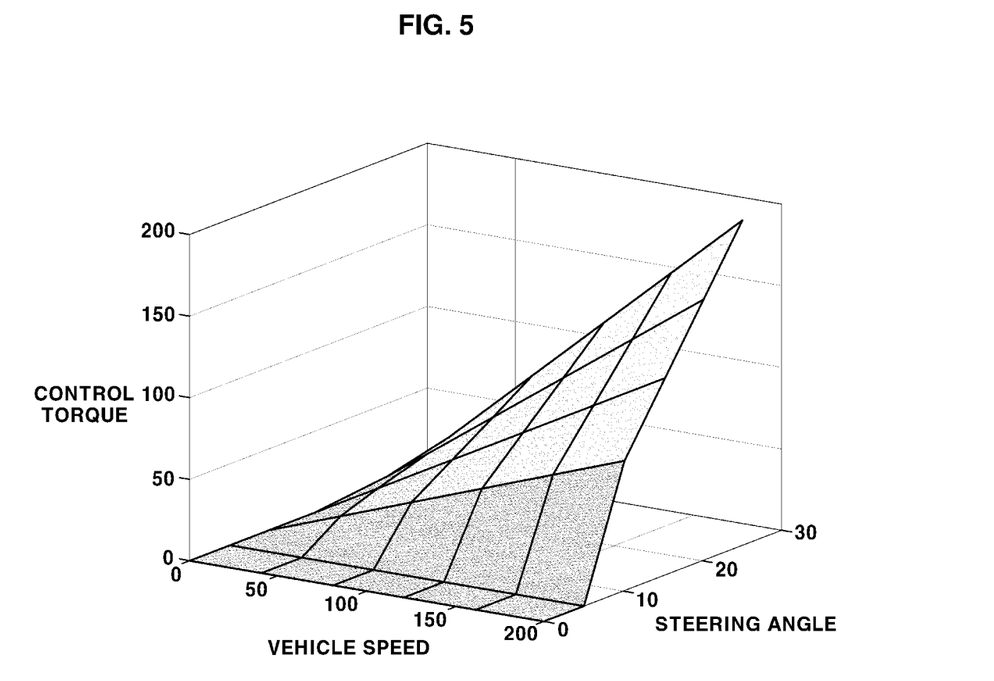
FIG. 5 is a graph illustrating an example of a control torque map for controlling switching to the manual driving mode of the autonomous vehicle according to embodiments of the present invention.

The autonomous driving controller 100 may determine control torque for maintaining straight-ahead driving, that is, control torque for maintaining straight-ahead driving of the vehicle without being affected by a steering direction according to a driver operation, by extracting the control torque from a control torque map including control torque for maintaining straight-ahead driving predetermined for each steering angle and vehicle speed as illustrated in FIG. 5, or may calculate control torque for maintaining straight-ahead driving using Equation 1, which will be described later.

In addition, the autonomous driving controller 100 may be configured to determine feedforward torque control for maintaining straight-ahead driving of the vehicle to be one of first-stage torque control and second-stage torque control including the first-stage torque control according to the magnitude of the control torque determined using the control torque map or Equation 1.

For example, the autonomous driving controller 100 may be configured to perform a control operation to determine the feedforward torque control for maintaining straight-ahead driving to be the first-stage torque control and execute the first-stage torque control when the control torque determined using the control torque map or Equation 1 is less than or equal to a first reference control torque, determine the feedforward torque control for maintaining straight-ahead driving to be the second-stage torque control including the first-stage torque control and execute the second-stage torque control when the control torque exceeds the first reference control torque and is less than or equal to a second reference control torque, and maintain the autonomous driving mode without switching to driving in the manual driving mode when the control torque exceeds the second reference control torque.

The first-stage torque control may be performed by additionally applying driving torque in addition to driving torque for current driving to one in-wheel motor on one side (for example, the in-wheel motor mounted on the rear wheel in the steering direction) among the in-wheel motors mounted on the respective wheels of the vehicle and applying regenerative braking torque to another one on the opposite side (for example, the in-wheel motor mounted on the rear wheel in the direction opposite to the steering direction) at the same time so that straight-ahead driving of the vehicle may be maintained.

The second-stage torque control may be performed by performing torque control for additionally applying driving torque in addition to driving torque for current driving to one in-wheel motor on one side (for example, the in-wheel motor mounted on the rear wheel in the steering direction) among the in-wheel motors mounted on the respective wheels of the vehicle, applying regenerative braking torque to another one on the opposite side (for example, the in-wheel motor mounted on the rear wheel in the direction opposite to the steering direction) at the same time so that straight-ahead driving of the vehicle may be maintained, and by applying hydraulic braking torque to the hydraulic braking device of the wheel equipped with the in-wheel motor (one in the direction opposite to the steering direction) to which the regenerative braking torque is applied.

In addition, in order to prevent a vehicle accident from occurring due to steering according to unintentional steering wheel operation by the driver, the autonomous driving controller 100 may be configured to perform a control operation to continuously maintain the autonomous driving mode without switching the current driving mode to the manual driving mode when the control torque determined using the control torque map or Equation 1 exceeds the second reference control torque.

Meanwhile, the autonomous driving controller 100 may be configured to further execute feedback control for adjusting a posture of the vehicle to a stable posture in order to address occurrence of a yaw rate change and a lateral acceleration change of the vehicle due to an increase in the steering angle caused by unintentional steering wheel operation by the driver after the first-stage torque control is executed or after the second-stage torque control is executed.

In addition, the autonomous driving controller 100 may be configured to perform a control operation to switch the driving mode of the autonomous vehicle to the manual driving mode desired by the driver upon determining that the posture of the vehicle is stabilized after executing the feedback control for adjusting the posture of the vehicle to the stable posture.

Here, a method of controlling switching to the manual driving mode according to embodiments of the present invention performed based on the above-described system configuration will be described in order as follows.

Figure 2:
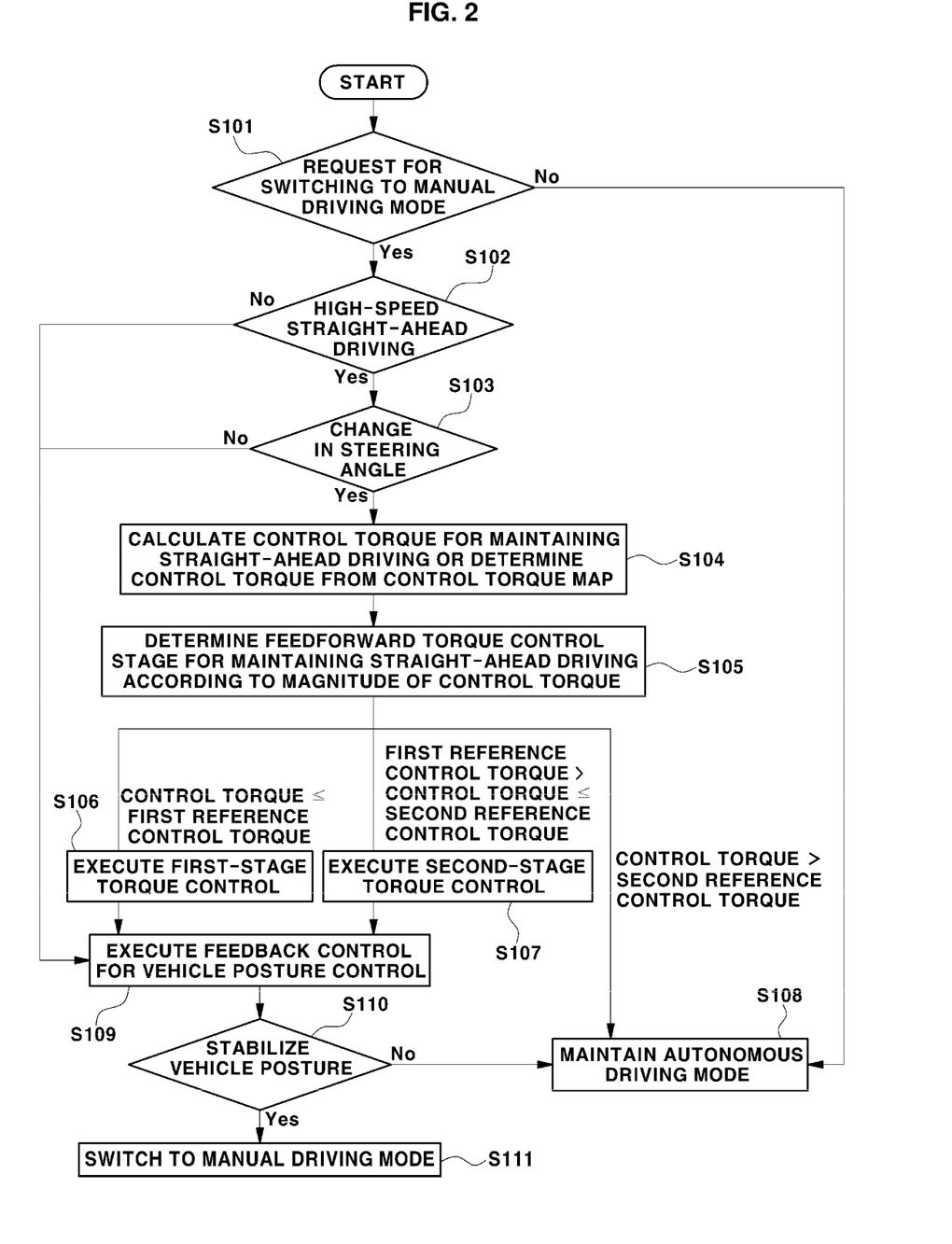
FIG. 2 is a flowchart illustrating a method of controlling switching to the manual driving mode of the autonomous vehicle according to embodiments of the present invention.

FIG. 2 is a flowchart illustrating the method of controlling switching to the manual driving mode of the autonomous vehicle according to embodiments of the present invention.

First, it is verified whether there is a request for switching to the manual driving mode by the driver (S101).

For example, when the manual driving mode of the driving mode selection switch 120 is selected and operated, the autonomous driving controller 100 may confirm that there is a request for switching to the manual driving mode from the driver.

Subsequently, when there is a request for switching to the manual driving mode (Yes at S101), it is determined whether the autonomous vehicle is driven straight ahead at high speed (S102).

For example, the autonomous driving controller 100 may verify whether a current vehicle speed is in a high-speed state exceeding a threshold speed based on a vehicle speed detection signal of a vehicle speed detection unit 122, and the autonomous driving controller 100 may determine whether the autonomous vehicle is in a straight-ahead driving state based on driving road information of the navigation and a detection signal of the steering angle sensor 112.

Next, when the vehicle is determined to be driven straight ahead at high speed (Yes at S102), it is determined whether the steering angle of the steering wheel is changed by a driver operation in the transition section in which the driving mode is switched from the autonomous driving mode to the manual driving mode during high-speed straight-ahead driving of the autonomous vehicle (S103).

For example, the autonomous driving controller 100 may verify whether the driver holds the steering wheel based on a steering torque detection signal of the torque sensor 116 transmitted from the steering controller 110 and verify whether there is a change in the steering angle of the steering wheel based on a detection signal of the steering angle sensor 112 transmitted from the steering controller 110.

In other words, when the driver holds the steering wheel in the autonomous driving state, the steering torque may increase slightly. Therefore, the autonomous driving controller 100 may check a state in which the driver holds the steering wheel, that is, a state in which the driver unintentionally operates the steering wheel, based on a steering torque detection signal of the torque sensor 116 transmitted from the steering controller 110, and confirm that the steering angle has changed according to the unintentional steering wheel operation of the driver based on the change value of the steering angle of the steering wheel transmitted from the steering controller 110.

As described above, in the transition section in which the autonomous vehicle switches to the manual driving mode while being driven straight ahead at high speed in the autonomous driving mode, the vehicle may rapidly become unstable due to occurrence of unstable yaw rate behavior of the vehicle by manual driving intervention such as unintentional steering wheel operation by the driver.

For example, in the transition section in which the autonomous driving mode is switched to the manual driving mode while the autonomous vehicle is driven straight ahead at high speed, when the driver unintentionally operates the steering wheel and causes even a slight steering angle, yaw rate behavior of the vehicle changes, so that the vehicle may not be maintained in a straight-ahead driving state, and the driving state of the vehicle may become unstable.

Accordingly, embodiments of the present invention focus on controlling driving torque and braking torque of the vehicle for maintaining straight-ahead driving of the vehicle irrespective of the steering direction according to a driver operation in advance before occurrence of unstable yaw rate behavior of the vehicle using a feedforward control scheme, so that the vehicle may be maintained in a stable straight-ahead driving state with priority, and thus the driver may easily switch to the desired manual driving mode.

To this end, upon determining that the autonomous vehicle is driven straight ahead at high speed as a result of determination in step S102, and upon determining that the steering angle has changed as a result of determination in step S103, the control torque for maintaining straight-ahead driving is calculated or determined from the control torque map (S104).

That is, the autonomous driving controller 100 may determine the control torque for maintaining straight-ahead driving, that is, the control torque for maintaining straight-ahead driving of the vehicle without being affected by the steering direction according to the driver operation, from the control torque map.

For example, predetermined control torque for maintaining straight-ahead driving may be extracted for each steering angle and vehicle speed from the control torque map illustrated in FIG. 5.

Alternatively, the autonomous driving controller 100 may calculate the control torque for maintaining straight-ahead driving using the following Equation 1.

Control torque=$K$×abs(abs(current steering angle)−critical steering angle)×(current vehicle speed−critical vehicle speed)     Equation 1:

In Equation 1 above, K denotes a fixed constant, and abs denotes an absolute value.

The control torque is torque for maintaining straight-ahead driving of the vehicle when a steering angle is generated according to unintentional steering wheel operation by the driver in the transition section in which the autonomous driving mode is switched to the manual driving mode, refers to torque including driving torque additionally applied to one in-wheel motor on one side (for example, the in-wheel motor mounted on the rear wheel in the steering direction) among the in-wheel motors mounted on respective wheels of the vehicle and regenerative braking torque applied to another one on the opposite side (for example, the in-wheel motor mounted on the rear wheel in the direction opposite to the steering direction), and may be determined to increase as the steering angle according to the steering wheel operation of the driver increases.

Alternatively, the control torque is torque for maintaining the straight-ahead driving of the vehicle when a steering angle is generated according to unintentional steering wheel operation by the driver in the transition section in which the autonomous driving mode is switched to the manual driving mode and refers to torque including hydraulic braking torque applied to the wheel equipped with the in-wheel motor to which regenerative braking torque is applied in addition to driving torque additionally applied to one in-wheel motor on one side (for example, the in-wheel motor mounted on the rear wheel in the steering direction) among the in-wheel motors mounted on respective wheels of the vehicle and regenerative braking torque applied to another one on the opposite side (for example, the in-wheel motor mounted on the rear wheel in the direction opposite to the steering direction).

Then, according to the magnitude of the control torque determined in step S104, one of a plurality of feedforward torque controls for maintaining straight-ahead driving may be selectively executed.

To this end, according to the magnitude of the control torque determined in the step S104, the feedforward torque control for maintaining straight-ahead driving of the vehicle may be determined to be one of the first-stage torque control and the second-stage torque control including the first-stage torque control (S105).

Figure 6:
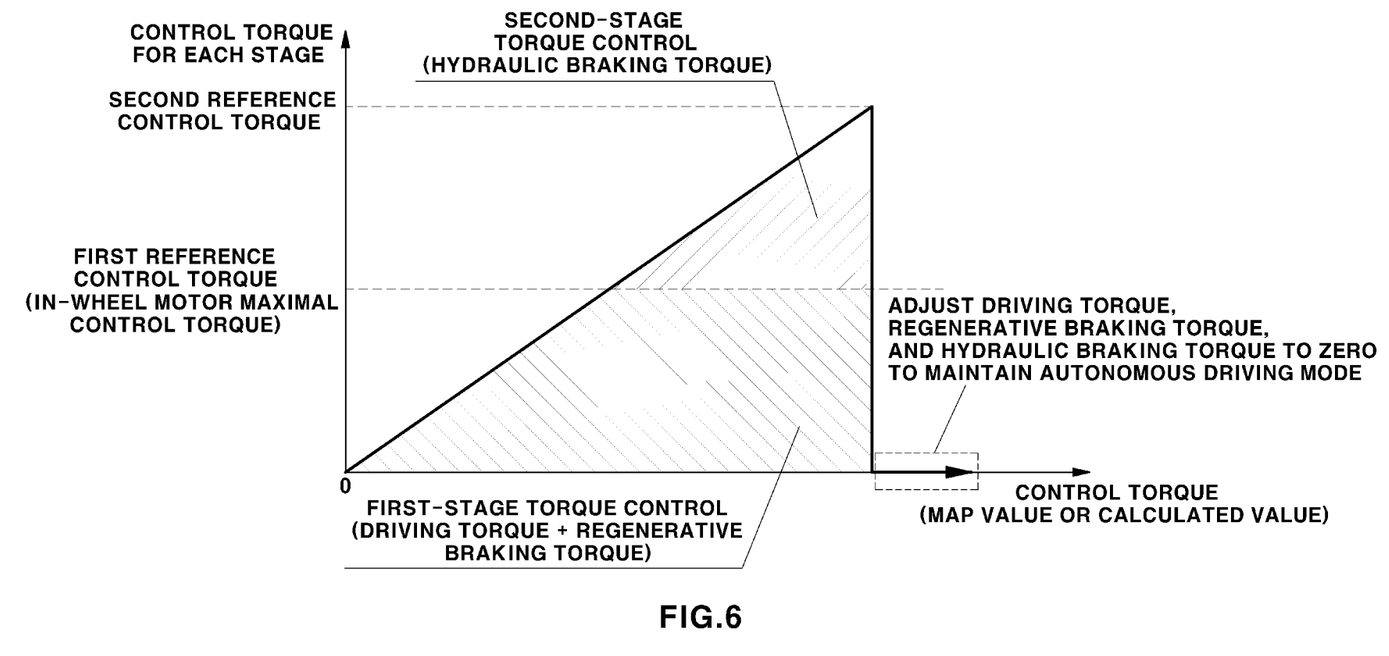
FIG. 6 is a graph illustrating a step-by-step control torque example for maintaining straight-ahead driving during switching to the manual driving mode of the autonomous vehicle according to embodiments of the present invention.

Referring to FIG. 6, the autonomous driving controller 100 performs a control operation to determine the feedforward torque control for maintaining straight-ahead driving to be the first-stage torque control when the control torque determined in step S104 is less than or equal to the first reference control torque, a control operation to determine the feedforward torque control for maintaining straight-ahead driving to be the second-stage torque control including the first-stage torque control when the control torque exceeds the first reference control torque and is less than or equal to the second reference control torque, or a control operation to maintain the autonomous driving mode without switching to driving in the manual driving mode when the control torque exceeds the second reference control torque.

In this instance, the first reference control torque is the maximum control torque for the in-wheel motor and may be determined as a value obtained by multiplying gain by a maximum value of the regenerative braking torque of the in-wheel motor.

In addition, when the control torque determined in step S104 is determined to be excessively large, the second reference control torque may be determined to be any level for limiting the behavior of the vehicle becoming more unstable due to the control torque.

When the feedforward torque control for maintaining the straight-ahead driving of the vehicle is determined to be the first-stage torque control in step S105, the first-stage torque control is executed (S106).

To this end, first, to execute the first-stage torque control, the autonomous driving controller 100 determines that the control torque (less than or equal to the first reference control torque) determined in step S104 is distributed as driving torque and regenerative braking torque of in-wheel motors and instructs the motor controller 140 to apply the driving torque and the regenerative braking torque.

More specifically, the control torque (less than or equal to the first reference control torque) determined in step S104 is determined to be distributed as driving torque additionally applied to one in-wheel motor on one side (for example, the in-wheel motor mounted on the rear wheel in the steering direction) among the in-wheel motors mounted on respective wheels of the vehicle and regenerative braking torque applied to another one on the opposite side (for example, the in-wheel motor mounted on the rear wheel in the direction opposite to the steering direction), and the autonomous driving controller 100 instructs the motor controller 140 to apply the driving torque and the regenerative braking torque.

For example, a driving wheel and a braking wheel are determined according to a steering direction and a steering angle according to a driver operation, ½ of the control torque (less than or equal to the first reference control torque) determined in step S104 is determined to be distributed as the driving torque applied to the in-wheel motor mounted on the driving wheel (the in-wheel motor mounted on the rear wheel in the steering direction), the remaining ½ of the control torque (less than or equal to the first reference control torque) determined in step S104 is determined to be distributed as the regenerative braking torque applied to the in-wheel motor mounted on the braking wheel (for example, the in-wheel motor mounted on the rear wheel in the direction opposite to the steering direction), and the motor controller 140 is instructed to apply the torques.

Therefore, straight-ahead driving of the vehicle may be maintained when the motor controller 140 performs torque control to additionally apply driving torque in addition to driving torque for current driving to one in-wheel motor on one side (for example, the in-wheel motor mounted on the rear wheel in the steering direction) among the in-wheel motors mounted on the respective wheels of the vehicle and apply regenerative braking torque to another one on the opposite side (for example, the in-wheel motor mounted on the rear wheel in the direction opposite to the steering direction) at the same time based on the first-stage torque control.

Figure 3:
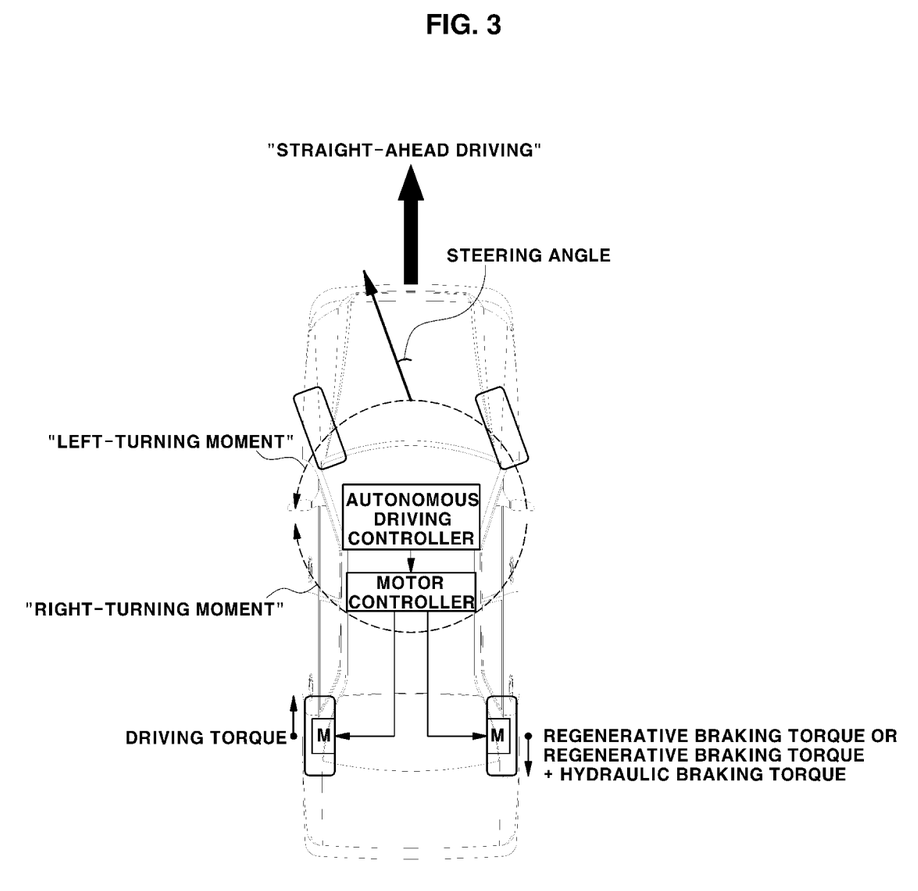
FIGS. 3 and 4 are schematic diagrams illustrating vehicle behavior states for controlling switching to the manual driving mode of the autonomous vehicle according to embodiments of the present invention.

For example, when a left steering angle is generated on each of left and right front wheels as illustrated in FIG. 3 according to unintentional steering wheel operation by the driver in the transition section in which the driving mode is switched from the autonomous driving mode to the manual driving mode during high-speed straight-ahead driving of the autonomous vehicle, left-turning yaw moment is generated in the vehicle. In this instance, straight-ahead driving of the vehicle may be maintained when the motor controller 140 performs a control operation to additionally apply driving torque in addition to driving torque for current driving to an in-wheel motor (in the steering direction) mounted on a left rear wheel and apply regenerative braking torque to an in-wheel motor (in the direction opposite to the steering direction) mounted on a right rear wheel at the same time, thereby generating right-turning moment in the vehicle.

Figure 4:
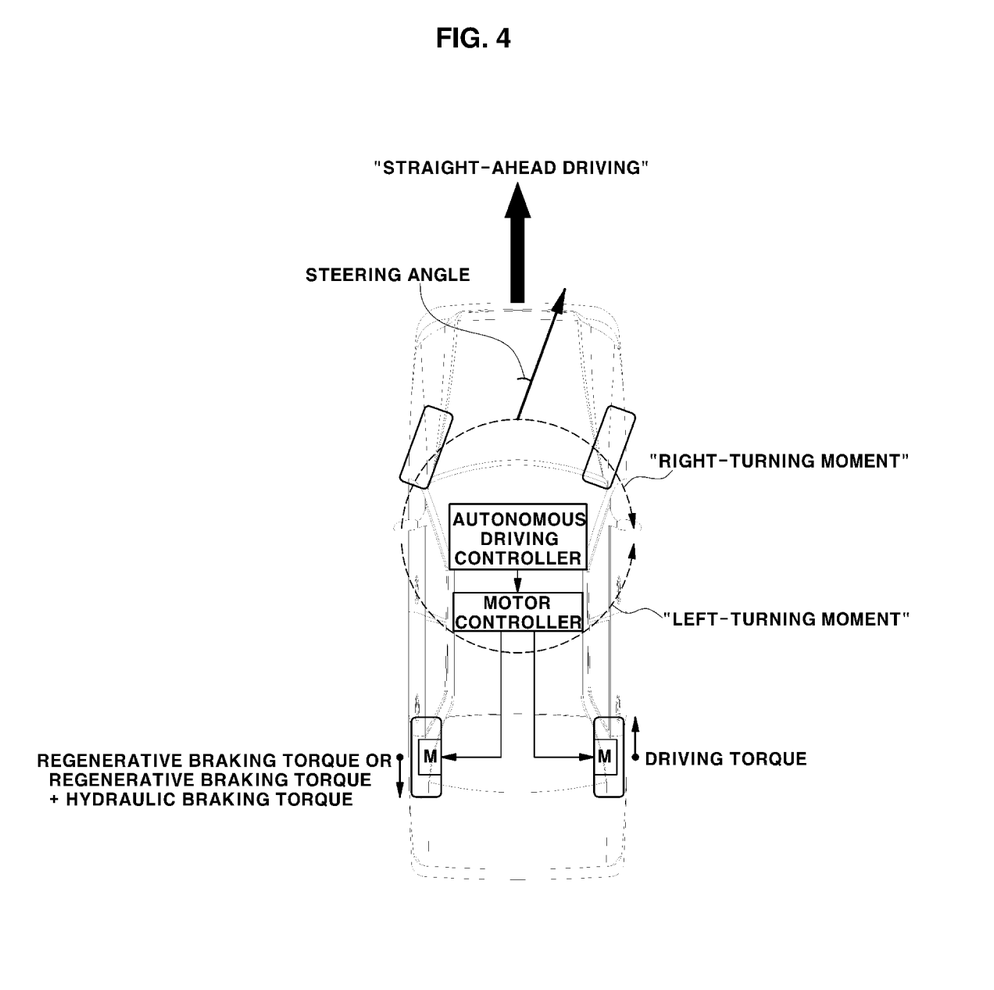

Alternatively, when a right steering angle is generated on each of left and right front wheels as illustrated in FIG. 4 according to unintentional steering wheel operation by the driver in the transition section in which the driving mode is switched from the autonomous driving mode to the manual driving mode during high-speed straight-ahead driving of the autonomous vehicle, right-turning yaw moment is generated in the vehicle. In this instance, straight-ahead driving of the vehicle may be maintained when the motor controller 140 performs a control operation to additionally apply driving torque in addition to driving torque for current driving to an in-wheel motor (in the steering direction) mounted on a right rear wheel and apply regenerative braking torque to an in-wheel motor (in the direction opposite to the steering direction) mounted on a left rear wheel at the same time, thereby generating left-turning moment in the vehicle.

When the feedforward torque control for maintaining straight-ahead driving of the vehicle is determined to be the second-stage torque control in step S105, the second-stage torque control including the first-stage torque control is executed (S107).

To this end, in order to execute the second-stage torque control including the first-stage torque control, the autonomous driving controller 100 determines to distribute a part of the control torque (exceeding the first reference control torque and less than or equal to the second reference control torque) determined in the above-described step S104 as the driving torque and the regenerative braking torque of the in-wheel motors and instructs the motor controller 140 to apply the torques, and further determines to distribute the remainder as the hydraulic braking torque and instructs the braking controller 130 to apply the hydraulic braking torque.

More specifically, a part (less than or equal to the first reference control torque) of the control torque (exceeding the first reference control torque and less than or equal to the second reference control torque) determined in the above-described step S104 is determined to be distributed as driving torque additionally applied to one in-wheel motor on one side (for example, the in-wheel motor mounted on the rear wheel in the steering direction) among the in-wheel motors mounted on the respective wheels of the vehicle and regenerative braking torque applied to another one on the opposite side (for example, the in-wheel motor mounted on the rear wheel in the direction opposite to the steering direction) as in the first-stage torque control, and the motor controller 140 is instructed to apply the torques. Further, the remainder (torque exceeding the first reference control torque) is determined to be distributed as hydraulic braking torque applied to a wheel on a side where regenerative braking torque is applied, and the braking controller 130 is instructed to apply the torque.

For example, after determining the driving wheel and the braking wheel according to the steering direction and steering angle according to the driver operation, ½ of a part (less than or equal to the first reference control torque) of the control torque (exceeding the first reference control torque and less than or equal to the second reference control torque) determined in step S104 is determined to be distributed as the driving torque applied to the in-wheel motor mounted on the driving wheel (the in-wheel motor mounted on the rear wheel in the steering direction), the remaining ½ of the part (less than or equal to the first reference control torque) of the control torque (exceeding the first reference control torque and less than or equal to the second reference control torque) determined in step S104 is determined to be distributed as the regenerative braking torque applied to the in-wheel motor mounted on the braking wheel (for example, the in-wheel motor mounted on the rear wheel in the direction opposite to the steering direction), and the motor controller 140 is instructed to apply the torques. Further, the remainder (torque exceeding the first reference control torque) of the control torque (exceeding the first reference control torque and less than or equal to the second reference control torque) determined in step S104 is determined to be distributed as hydraulic braking torque applied to a wheel on a side where regenerative braking torque is applied, and the braking controller 130 is instructed to apply the torque.

Therefore, straight-ahead driving of the vehicle may be maintained when the motor controller 140 performs torque control to additionally apply driving torque in addition to driving torque for current driving to one in-wheel motor on one side (for example, the in-wheel motor mounted on the rear wheel in the steering direction) among the in-wheel motors mounted on the respective wheels of the vehicle and apply regenerative braking torque to another one on the opposite side (for example, the in-wheel motor mounted on the rear wheel in the direction opposite to the steering direction) at the same time based on the second-stage torque control, and the braking controller 130 performs a control operation to apply hydraulic braking torque to the hydraulic braking device of the wheel equipped with the in-wheel motor (one in the direction opposite to the steering direction) to which the regenerative braking torque is applied.

For example, when a left steering angle is generated on each of left and right front wheels as illustrated in FIG. 3 according to unintentional steering wheel operation by the driver in the transition section in which the driving mode is switched from the autonomous driving mode to the manual driving mode during high-speed straight-ahead driving of the autonomous vehicle, left-turning yaw moment is generated in the vehicle. In this instance, straight-ahead driving of the vehicle may be maintained when the motor controller 140 performs a control operation to additionally apply driving torque in addition to driving torque for current driving to the in-wheel motor (in the steering direction) mounted on the left rear wheel and to apply regenerative braking torque to the in-wheel motor (in the direction opposite to the steering direction) mounted on the right rear wheel at the same time, and the braking controller 130 applies hydraulic braking torque to the hydraulic braking device of the wheel equipped with the in-wheel motor (one in the direction opposite to the steering direction) to which the regenerative braking torque is applied, thereby generating right-turning moment in the vehicle.

Alternatively, when a right steering angle is generated on each of left and right front wheels as illustrated in FIG. 4 according to unintentional steering wheel operation by the driver in the transition section in which the driving mode is switched from the autonomous driving mode to the manual driving mode during high-speed straight-ahead driving of the autonomous vehicle, right-turning yaw moment is generated in the vehicle. In this instance, straight-ahead driving of the vehicle may be maintained when the motor controller 140 performs a control operation to additionally apply driving torque in addition to driving torque for current driving to the in-wheel motor (in the steering direction) mounted on the right rear wheel and to apply regenerative braking torque to the in-wheel motor (in the direction opposite to the steering direction) mounted on the left rear wheel at the same time, and the braking controller 130 applies hydraulic braking torque to the hydraulic braking device of the wheel equipped with the in-wheel motor (one in the direction opposite to the steering direction) to which the regenerative braking torque is applied, thereby generating left-turning moment in the vehicle.

On the other hand, upon determining that the control torque for maintaining the straight-ahead driving determined in step S104 exceeds the second reference control torque, the autonomous driving mode is maintained without switching to driving in the manual driving mode (S108).

For example, when the steering angle according to the unintentional steering wheel operation of the driver continues to increase in the transition section in which the driving mode is switched from the autonomous driving mode to the manual driving mode during high-speed straight-ahead driving of the autonomous vehicle, the control torque determined in step S104 may exceed the second reference control torque, and the behavior of the vehicle may become more unstable by the control torque exceeding the second reference control torque. Therefore, the autonomous driving controller 100 performs a control operation to maintain the autonomous driving mode without switching to the manual driving mode.

Therefore, an accident of the vehicle may be prevented by performing a control operation to continuously maintain the current driving mode in the autonomous driving mode before occurrence of unstable behavior of the vehicle according to the unintentional steering wheel operation of the driver in the transition section in which the driving mode is switched from the autonomous driving mode to the manual driving mode during high-speed straight-ahead driving of the autonomous vehicle.

In this way, high-speed straight-ahead driving of the autonomous vehicle may be stably maintained by controlling, using the feedforward control scheme, the driving torque and braking torque of the vehicle for maintaining straight-ahead driving without being affected by the steering direction according to the driver operation before occurrence of unstable yaw rate behavior of the vehicle due to the steering angle according to the unintentional steering wheel operation of the driver in the transition section in which the driving mode is switched from the autonomous driving mode to the manual driving mode during high-speed straight-ahead driving of the autonomous vehicle.

Meanwhile, after the first-stage torque control in step S106 is executed or after the second-stage torque control in step S107 is executed, the autonomous driving controller 100 checks a yaw rate change and a lateral acceleration change of the vehicle.

That is, even though the target yaw rate is maintained at zero (0) at all times for vehicle driving stability and behavior stabilization during high-speed straight-ahead driving of the autonomous vehicle, when a steering angle change occurs due to unintentional steering wheel operation by the driver, the yaw rate and lateral acceleration that make the vehicle behavior unstable may increase. Therefore, after the first-stage torque control in step S106 is executed or after the second-stage torque control in step S107 is executed, the autonomous driving controller 100 checks a change in the yaw rate, a change in the lateral acceleration, etc. of the vehicle.

For example, the autonomous driving controller 100 may check a change in the yaw rate of the vehicle based on a detection signal of a yaw rate sensor 124, may check a change in the lateral acceleration of the vehicle based on a detection signal of a lateral acceleration sensor, and may determine that a current yaw rate coincides with zero, which is the target yaw rate, when there is no change in the yaw rate.

Subsequently, when a change in the yaw rate and a change in the lateral acceleration of the vehicle occur, the autonomous driving controller 100 executes feedback control for adjusting the vehicle posture to be a stable posture (S109).

Meanwhile, even when it is determined that the autonomous vehicle is not driven straight ahead at high speed as a result of determination in step S102 or it is determined that there is no change in the steering angle as a result of determination in step S103, if a change in the yaw rate, a change in the lateral acceleration, etc. of the vehicle occurs, feedback control for adjusting the posture of the vehicle to a stable posture may be executed.

For example, as is well known, feedback control for vehicle posture control may include a process of detecting, by the yaw rate sensor, an actual yaw rate due to a change in the steering angle according to unintentional steering wheel operation by the driver, a process of comparing the actual yaw rate, which is a detected value of the yaw rate sensor, with a target yaw rate, and a process of performing braking control for stable posture control of the vehicle when a difference between the target yaw rate and the actual yaw rate is greater than or equal to a certain value as a result of comparison.

Subsequently, after executing feedback control for adjusting the posture of the vehicle to a stable posture, the autonomous driving controller 100 determines whether the posture of the vehicle is stabilized (Silo).

For example, when the actual yaw rate of the vehicle coincides with zero, which is the target yaw rate, based on the feedback control for posture control of the vehicle, it is possible to determine that the posture of the vehicle is stabilized.

Upon determining that the posture of the vehicle is stabilized as a result of determination in step S110, a control operation is performed to switch the driving mode of the autonomous vehicle to the manual driving mode desired by the driver (S111).

As such, even when a steering angle is generated according to unintentional steering wheel operation by the driver in the transition section in which the driving mode is switched from the autonomous driving mode to the manual driving mode while the autonomous vehicle is driven straight ahead at high speed, if the driving torque and the braking torque of the vehicle are controlled to maintain straight-ahead driving using the feedforward control scheme and then feedback control is further performed to prevent unstable behavior of the vehicle due to a change in the yaw rate of the vehicle, it is possible to continuously maintain the target yaw rate at zero (0) while high-speed straight-ahead driving is maintained, and accordingly, it is possible to stably switch to the manual driving mode desired by the driver.

Embodiments of the present invention can provide the following effects.

First, high-speed straight-ahead driving of the autonomous vehicle may be stably maintained by controlling, using the feedforward control scheme, the driving torque and braking torque of the vehicle for maintaining straight-ahead driving without being affected by the steering direction according to the driver operation before occurrence of unstable yaw rate behavior of the vehicle due to the steering angle according to unintentional steering wheel operation by the driver in the transition section in which the driving mode is switched from the autonomous driving mode to the manual driving mode during high-speed straight-ahead driving of the autonomous vehicle.

Second, even when a steering angle is generated according to unintentional steering wheel operation by the driver in the transition section in which the driving mode is switched from the autonomous driving mode to the manual driving mode while the autonomous vehicle is driven straight ahead at high speed, if the driving torque and the braking torque of the vehicle are controlled to maintain straight-ahead driving using the feedforward control scheme, and then feedback control is further performed to prevent unstable behavior of the vehicle due to a change in the yaw rate of the vehicle, it is possible to continuously maintain the target yaw rate at zero (o) while high-speed straight-ahead driving is maintained, and accordingly, it is possible to stably switch to the manual driving mode desired by the driver.

Even though embodiments of the present invention have been described in detail above, the scope of the present invention is not limited to the embodiments described above, and various modifications and improvements by those skilled in the art using the basic concepts of the present invention as defined in the claims below will be included in the scope of the present invention.

What is claimed is:

1. A system for controlling switching to a manual driving mode of an autonomous vehicle, the system comprising:
   a steering controller configured to determine whether a steering angle is changed according to operation of a steering wheel by a driver;
   a braking controller configured to apply braking torque to a braking device of each wheel;
   a motor controller configured to apply individual regenerative braking torque and driving torque to each wheel; and
   an autonomous driving controller configured to determine a control torque for maintaining straight-ahead driving and to issue an instruction using a feedforward control scheme when a steering angle change signal according to the operation of the steering wheel by the driver is received from the steering controller in a transition section in which an autonomous driving mode is switched to the manual driving mode during the straight-ahead driving of the autonomous vehicle,
   wherein the autonomous driving controller is configured to:
      determine feedforward torque control for maintaining the straight-ahead driving to be first-stage torque control and execute the first-stage torque control when the control torque for maintaining the straight-ahead driving is less than or equal to a first reference control torque; and
      determine the feedforward torque control for maintaining the straight-ahead driving to be second-stage torque control including the first-stage torque control and execute the second-stage torque control when the control torque for maintaining the straight-ahead driving exceeds the first reference control torque and is less than or equal to a second reference control torque.

2. The system of claim 1, further comprising:
   a steering angle sensor configured to detect a change in the steering angle of the steering wheel and to transmit a steering angle signal to the steering controller; and
   a torque sensor configured to detect steering torque when the driver holds the steering wheel and to transmit a steering torque signal to the steering controller.

3. The system of claim 1, wherein the autonomous driving controller is configured to determine the control torque for maintaining the straight-ahead driving from a control torque map including the control torque predetermined for each steering angle and vehicle speed.

4. The system of claim 1, wherein the autonomous driving controller is configured to calculate the control torque for maintaining the straight-ahead driving using an equation, [Control torque=K×abs(abs(current steering angle)−critical steering angle)×(current vehicle speed−critical vehicle speed)], wherein K denotes a fixed constant and abs denotes an absolute value.

5. The system of claim 1, wherein the autonomous driving controller is configured to execute the first-stage torque control by applying an additional driving torque in addition to a driving torque for current driving to one of respective wheels of the vehicle on one side in a steering direction and applying regenerative braking torque to another one of the respective wheels on an opposite side in the steering direction at the same time.

6. The system of claim 1, wherein the autonomous driving controller is configured to execute the second-stage torque control by applying an additional driving torque in addition to a driving torque for current driving to one of respective wheels of the vehicle on one side in a steering direction, applying regenerative braking torque to another one of the respective wheels on an opposite side in the steering direction at the same time, and applying braking torque to the wheel to which the regenerative braking torque is applied.

7. The system of claim 1, wherein, when the control torque for maintaining the straight-ahead driving exceeds the second reference control torque, the autonomous driving controller is configured to perform a control operation to maintain the autonomous driving mode without switching to the manual driving mode.

8. The system of claim 1, wherein the autonomous driving controller is configured to further execute feedback control for adjusting a posture of the vehicle to a stable posture to address occurrence of a yaw rate change and a lateral acceleration change of the vehicle after the first-stage torque control or the second-stage torque control is executed.

9. The system of claim 8, wherein, upon determining that the posture of the vehicle is stabilized after executing feedback control for adjusting the posture of the vehicle to the stable posture, the autonomous driving controller is configured to perform a control operation to switch a driving mode of the autonomous vehicle to the manual driving mode desired by the driver.

10. A method of controlling switching to a manual driving mode of an autonomous vehicle, the method comprising:
   verifying whether there is a request for switching to the manual driving mode while the autonomous vehicle is driven in an autonomous driving mode;
   determining whether the autonomous vehicle is driven straight ahead in response to a determination that there is the request for switching to the manual driving mode;
   determining whether there is a change in a steering angle of a steering wheel by an operation of a driver in a transition section in which the autonomous driving mode is switched to the manual driving mode during straight-ahead driving;
   determining a control torque for maintaining straight-ahead driving in response to a determination that there is the change in the steering angle of the steering wheel by the operation of the driver; and
   executing feedforward torque control for maintaining straight-ahead driving according to a magnitude of the determined control torque,
   wherein:
      when the control torque for maintaining the straight-ahead driving is determined to be less than or equal to a first reference control torque, a first-stage torque control is executed as the feedforward torque control for maintaining the straight-ahead driving; and when the control torque for maintaining the straight-ahead driving is determined to exceed the first reference control torque and to be less than or equal to a second reference control torque, a second-stage torque control including the first-stage torque control is executed as the feedforward torque control for maintaining the straight-ahead driving.

11. The method of claim 10, wherein determining whether there is the change in the steering angle of the steering wheel comprises:

verifying whether the driver holds the steering wheel based on a steering torque detection signal of a torque sensor; and determining the change in the steering angle of the steering wheel based on a steering angle detection signal of a steering angle sensor.

12. The method of claim 10, wherein the control torque for maintaining the straight-ahead driving is determined from a control torque map including the control torque predetermined for each steering angle and vehicle speed.

13. The method of claim 10, wherein the control torque for maintaining the straight-ahead driving is calculated using an equation, [Control torque=K×abs(abs(current steering angle)−critical steering angle)×(current vehicle speed−critical vehicle speed)], wherein K denotes a fixed constant and abs denotes an absolute value.

14. The method of claim 10, wherein the first-stage torque control is performed by applying an additional driving torque in addition to a driving torque for current driving to one of respective wheels of the vehicle on one side in a steering direction and applying regenerative braking torque to another one of the respective wheels on an opposite side in the steering direction at the same time.

15. The method of claim 10, wherein the second-stage torque control is performed by applying an additional driving torque in addition to a driving torque for current driving to one of respective wheels of the vehicle on one side in a steering direction, applying regenerative braking torque to another one of the respective wheels on an opposite side in the steering direction at the same time, and applying braking torque to the wheel to which the regenerative braking torque is applied.

16. The method of claim 10, wherein, when the control torque for maintaining the straight-ahead driving is determined to exceed the second reference control torque, a control operation is performed to maintain the autonomous driving mode without switching to the manual driving mode.

17. The method of claim 10, further comprising executing feedback control for adjusting a posture of the vehicle to a stable posture to address occurrence of a yaw rate change and a lateral acceleration change of the vehicle after the first-stage torque control or the second-stage torque control is executed.

18. The method of claim 17, further comprising, upon determining that the posture of the vehicle is stabilized after executing the feedback control for adjusting the posture of the vehicle to the stable posture, performing a control operation to switch a driving mode of the autonomous vehicle to the manual driving mode desired by the driver.

* * * * *